United States Patent
Roth et al.

(10) Patent No.: US 10,396,477 B2
(45) Date of Patent: Aug. 27, 2019

(54) FASTENING DEVICE FOR CONNECTOR IN AUTOMOTIVE LIGHT EQUIPMENT

(71) Applicant: Valeo North America, Inc., Troy, MI (US)

(72) Inventors: Fred Roth, Seymour, IN (US); Julien Hemon, Seymour, IN (US); Jonathan Blandin, Seymour, IN (US); Tyler Ryan, Seymour, IN (US); Kable Walton, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 15/804,436

(22) Filed: Nov. 6, 2017

(65) Prior Publication Data

US 2019/0140377 A1    May 9, 2019

(51) Int. Cl.

| | |
|---|---|
| *B60Q 1/00* | (2006.01) |
| *F16B 2/22* | (2006.01) |
| *H01R 12/70* | (2011.01) |
| *H01R 12/72* | (2011.01) |
| *H01R 13/73* | (2006.01) |
| *H01R 13/533* | (2006.01) |

(52) U.S. Cl.
CPC ....... *H01R 12/7029* (2013.01); *B60Q 1/0088* (2013.01); *H01R 12/7058* (2013.01); *H01R 12/722* (2013.01); *H01R 13/533* (2013.01); *H01R 13/73* (2013.01); *F16B 2/22* (2013.01)

(58) Field of Classification Search
CPC .. H01R 12/7029; H01R 13/73; H01R 12/722; F16B 5/065; Y10T 24/44026
See application file for complete search history.

(56) References Cited

U.S. PATENT DOCUMENTS

| | | |
|---|---|---|
| 5,542,854 A | 8/1996 | Bowen |
| 5,754,406 A | 5/1998 | Hardt et al. |
| 8,851,916 B2 | 10/2014 | Chen |
| 9,306,327 B1 * | 4/2016 | Plaza ................... H01R 13/639 |
| 9,751,489 B2 * | 9/2017 | Yamamoto ............ B60R 21/216 |
| 9,982,694 B2 * | 5/2018 | Scroggie ............... F16B 19/008 |
| 2002/0028597 A1 | 3/2002 | Nagai |

\* cited by examiner

*Primary Examiner* — Briggitte R. Hammond
(74) *Attorney, Agent, or Firm* — Oblon, McClelland, Maier & Neustadt, L.L.P.

(57) ABSTRACT

A fastening device to maintain a connector engaged in an electronic assembly, the fastening device including a body, a first clip member that engages in a first opening, the first clip member having a first shank that protrudes substantially perpendicularly from the body, and a first arm that protrudes the first shank towards the body, a second clip member that engages in a second opening, the second clip member having a second shank that protrudes substantially perpendicular from the body, and a pair of second arms that protrudes from the second shank towards the body, and a head affixed to the body that contacts the connector and maintains the connector engaged in the electronic assembly.

20 Claims, 7 Drawing Sheets

FASTENING DEVICE FOR CONNECTOR IN AUTOMOTIVE LIGHT EQUIPMENT

BACKGROUND

Field of the Disclosure

The present disclosure relates to fastening devices and in particular to fastening devices in automotive light equipment.

Description of the Related Art

In today's automotive industry, lighting systems rely heavily on electronic systems, e.g. Printed Circuit Boards (PCB), Light Emitting Diodes (LED), and/or microprocessors, to enhance visibility. These electronic systems are often connected between each other and/or connected to other essential elements of the vehicles, e.g. controllers, sensors, and/or power sources, via electrical connectors.

However, due to internal and/or external perturbations inevitably present in vehicles, e.g. engine vibrations, road imperfections, collisions, heavy braking, or the like, these electrical connectors may be detached and/or disengaged which can generate electrical disconnection problems that can render the light systems malfunctioning or even inoperative.

Thus, an electronic system solving the aforementioned limitations is desired.

SUMMARY

Accordingly, the object of the present disclosure is to provide a light assembly that addresses the above mentioned limitation of electrical disconnection.

The light assembly of the present disclosure prevents electrical disconnection problems from happening by relying on a fastening device that can be manually inserted onto support structures of the light assembly.

In one non-limiting illustrative example, a light assembly for vehicle is presented. The light assembly includes an electronic assembly, a connector that engages in the electronic assembly, a support that supports the electronic assembly, the support having an opening, and a connector opening that provides to the connector access to the electronic assembly; and a fastening device that engages in the support. The fastening device having a body, a first clip member that engages in the opening, the first clip member having a first shank that protrudes substantially perpendicularly from the body, and a first arm that protrudes from the first shank towards the body, a second clip member that engages in the connector opening, the second clip member having a second shank that protrudes substantially perpendicular from the body, and a pair of second arms that protrudes from the second shank towards the body, and a head affixed to the body that contacts the connector and maintains the connector engaged in the electronic assembly.

In one aspect, the first arm is bendable from an open position to a closed position to have the first clip member inserted in a notch of the opening connector.

In one aspect, the pair of second arms is articulable from an open position to a closed position to have the second clip member inserted in the opening.

In another aspect, each second arm of the pair of second arms includes a fluke that rests on an edge of the opening when the second clip member is inserted in the opening.

In one aspect, the body further includes a ridge that protrudes.

In another aspect, the fastening device further includes a tail that protrudes from the body.

In another aspect, the electronic assembly includes a printed circuit board.

In another aspect, the support includes a seat to receive the printed circuit board and to act as a heat sink.

In another aspect, the connector includes a mouth to receive a peripheral edge of the printed circuit board.

In one non-limiting illustrative example, a fastening device to maintain a connector engaged in an electronic assembly is presented. The fastening device includes a body, a first clip member that engages in a first opening, the first clip member having a first shank that protrudes substantially perpendicularly from the body, and a first arm that protrudes from the shank towards the body, a second clip member that engages in a second opening, the second clip member having a second shank that protrudes substantially perpendicular from the body, and a pair of second arms that protrudes from the second shank towards the body; and a head affixed to the body that contacts the connector and maintains the connector engaged in the electronic assembly.

In one aspect, the first arm is bendable from an open position to a closed position to have the first clip member inserted in the first opening.

In another aspect, the pair of second arms is bendable from an open position to a closed position to have the second clip member inserted in the second opening.

In another aspect, each second arm of the pair of second arms includes a fluke that rests on an edge of the second opening when the second clip member is inserted in the second opening.

In another aspect, the body further includes a ridge.

In another aspect, the fastening device further includes a tail that protrudes from the body.

In one non-limiting illustrative example, a fastening device to maintain a connector engaged in an electronic assembly is presented. The fastening device includes a body, a clip member that engages in an opening, the clip member having a shank that protrudes substantially perpendicular from the body, and a pair of arms that protrudes from the shank towards the body; and a head affixed to the body that contacts the connector and maintains the connector engaged in the electronic assembly.

In one aspect, the pair of arms is bendable, from an open position to a closed position to have the clip member inserted in the second opening.

In another aspect, each arm of the pair of arms includes a fluke that rests on an edge of the opening when the clip member inserted in the opening.

In another aspect, the body further includes a ridge.

In another aspect, the fastening device farther includes a tail that protrudes from the body.

BRIEF DESCRIPTION OF THE SEVERAL VIEWS OF THE DRAWINGS

To easily identify the discussion of any particular element or act, the most significant digit or digits in a reference number refer to the figure umber in which that element is first introduced.

DETAILED DESCRIPTION

Figure 1:
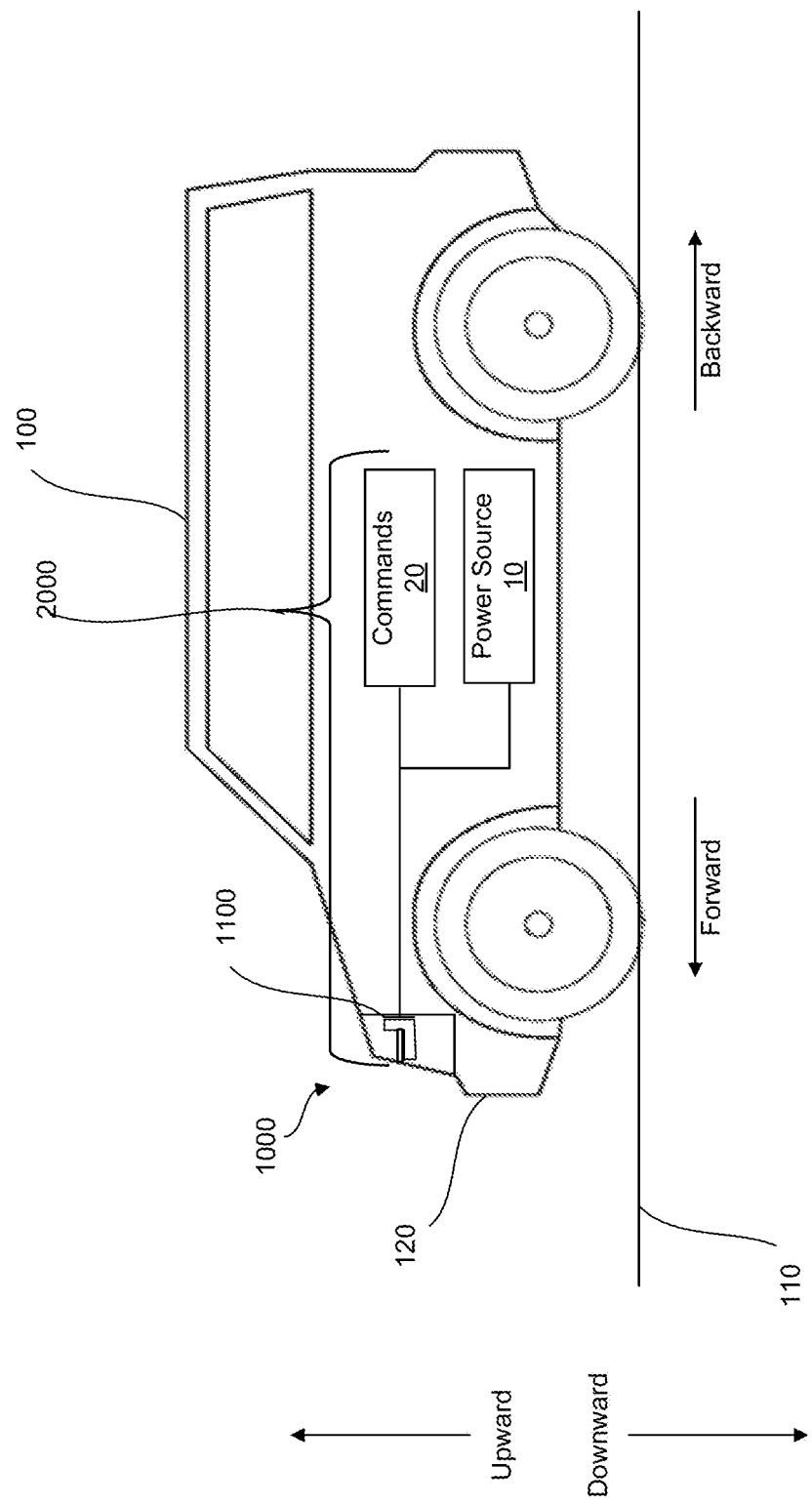
FIG. 1 is side view of a lighting system of a vehicle, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a" "an", and the like include a meaning of "one or more", unless stated otherwise. The drawings are generally drawn not to scale unless specified otherwise or illustrating schematic structures or flowcharts.

FIG. 1 is a side view of a lighting system 2000 of a vehicle 100, according to certain aspects of the disclosure.

The lighting system 2000 of a vehicle 100 can include a power source 10, e.g. battery, alternator, or the like, that provides an input power, commands 20, e.g. light switch, turn signal, braking, or the like, that provide actuation signals commensurate with lighting functions, e.g. daytime running light (DRL), high beam light, turning, braking light, or the like, a light assembly 1000 mounted into a housing 1100 that receives the input power and the actuation signals and provides lights according to the actuation signals.

Due to internal and/or external perturbations, e.g. engine vibrations, road imperfections, collisions, heavy braking, or the like, electrical connectors that provide electrical connections between the light assembly 1000 and other essential elements of the lighting system 2000, e.g. the power source 10 and/or the commands 20, may be detached and/or disengaged. Such disengagements or detachments of the electrical connectors can generate electrical disconnection problems that can render the lighting system 2000 malfunctioning or even inoperative.

The light assembly 1000 of the present disclosure prevents electrical disconnection problems from happening by relying on a fastening device A-1000 that can be manually inserted onto support structures of the light assembly 1000.

As used herein, the term "lower" and/or "downward" refer to the region of the light assembly 1000 closest to a ground surface 110 on which the vehicle 100 is driving, the term "upper" and/or "upward" refer to the region of the light assembly 1000 farthest from the ground surface 110, the terms "front" and/or "forward" refer to the region of the light assembly 1000 closest to a bumper 120 of the vehicle 100, the terms "back" and/or "backward" refer to the region of the light assembly 1000 farthest from the bumper 120.

Figure 2A:
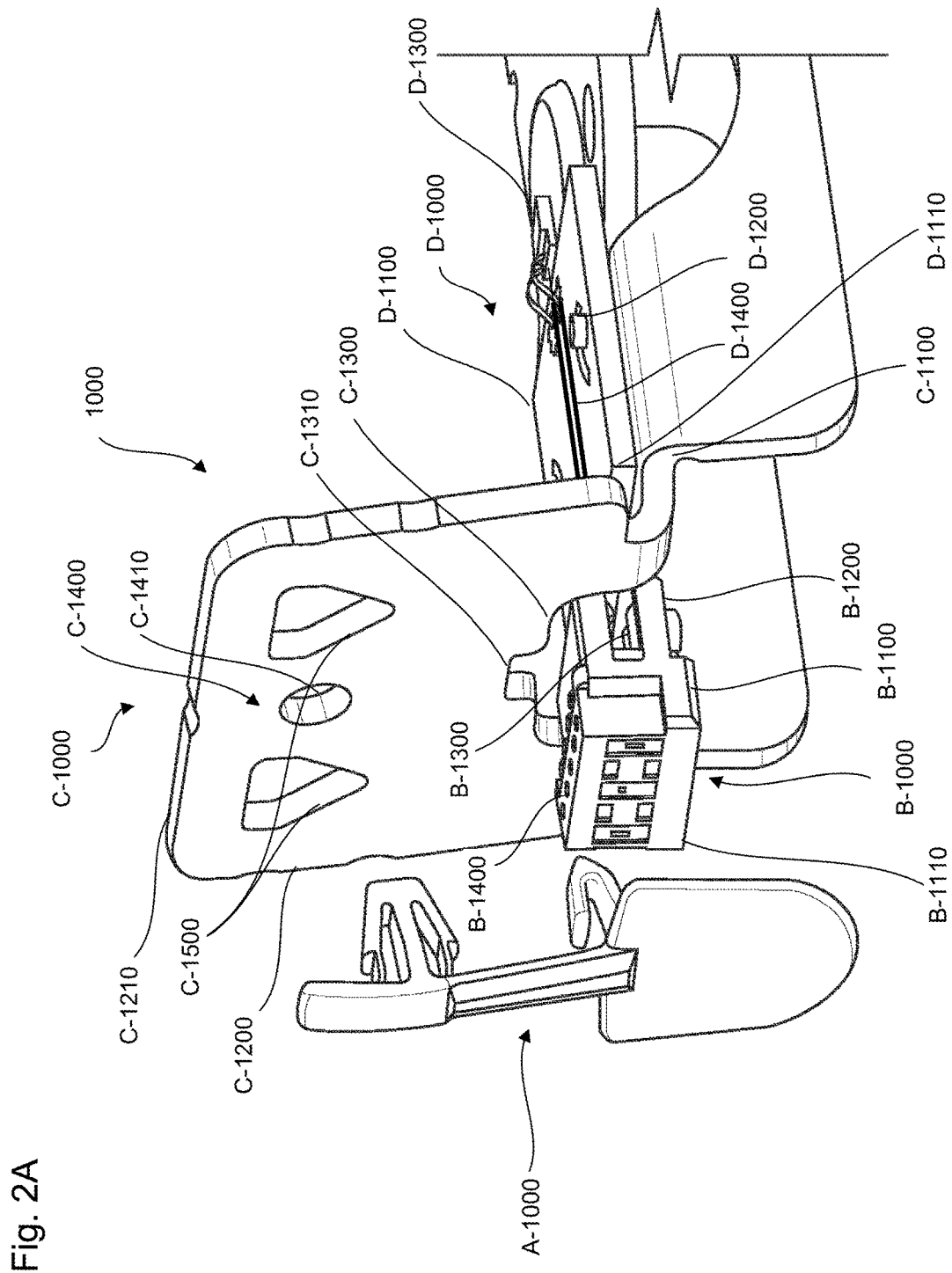
FIG. 2A is a perspective exploded view of an light assembly of the lighting system, according to certain aspects of the disclosure.
Figure 2B:
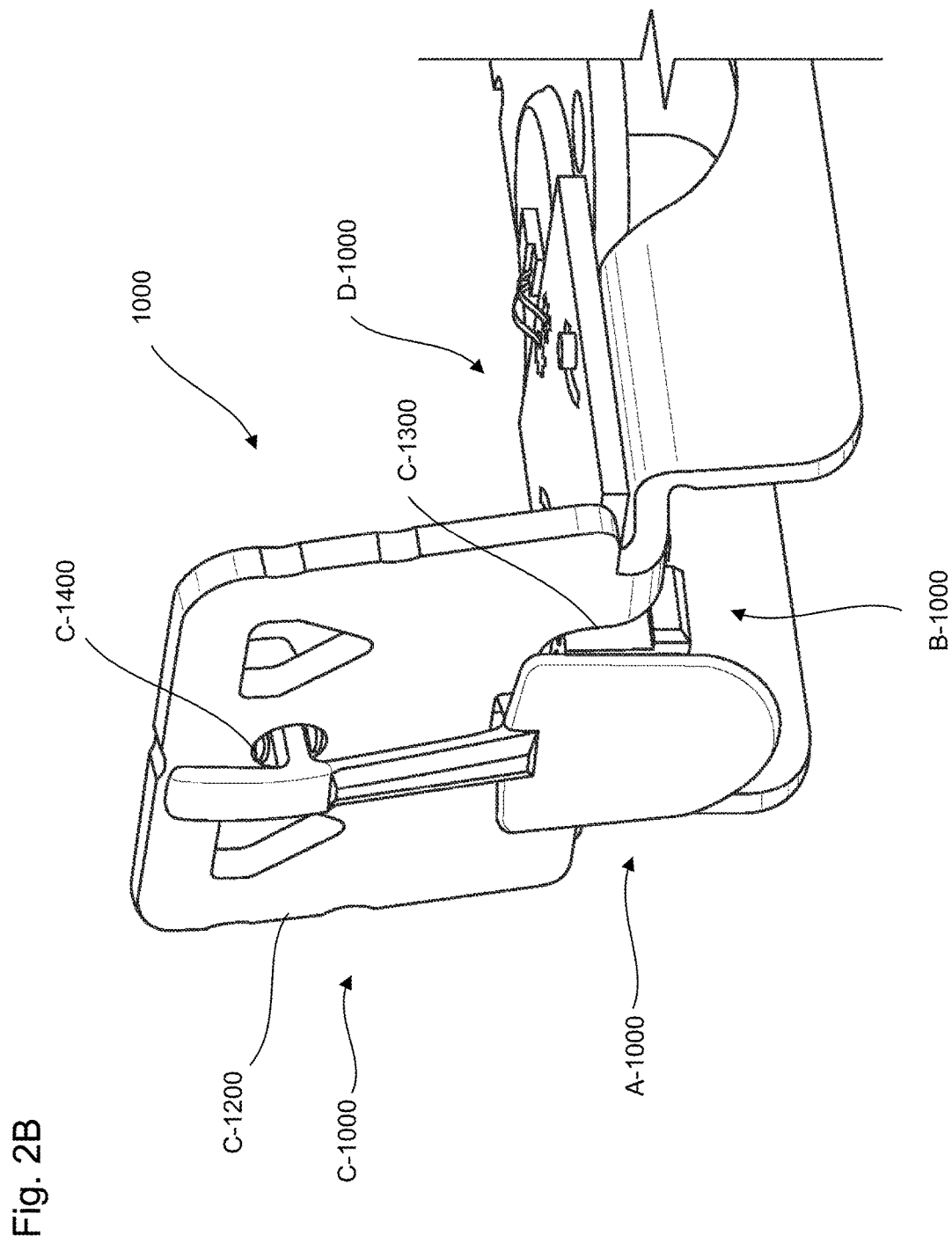
FIG. 2B is a perspective assembled view of the light assembly, according to certain aspects of the disclosure.
Figure 2C:
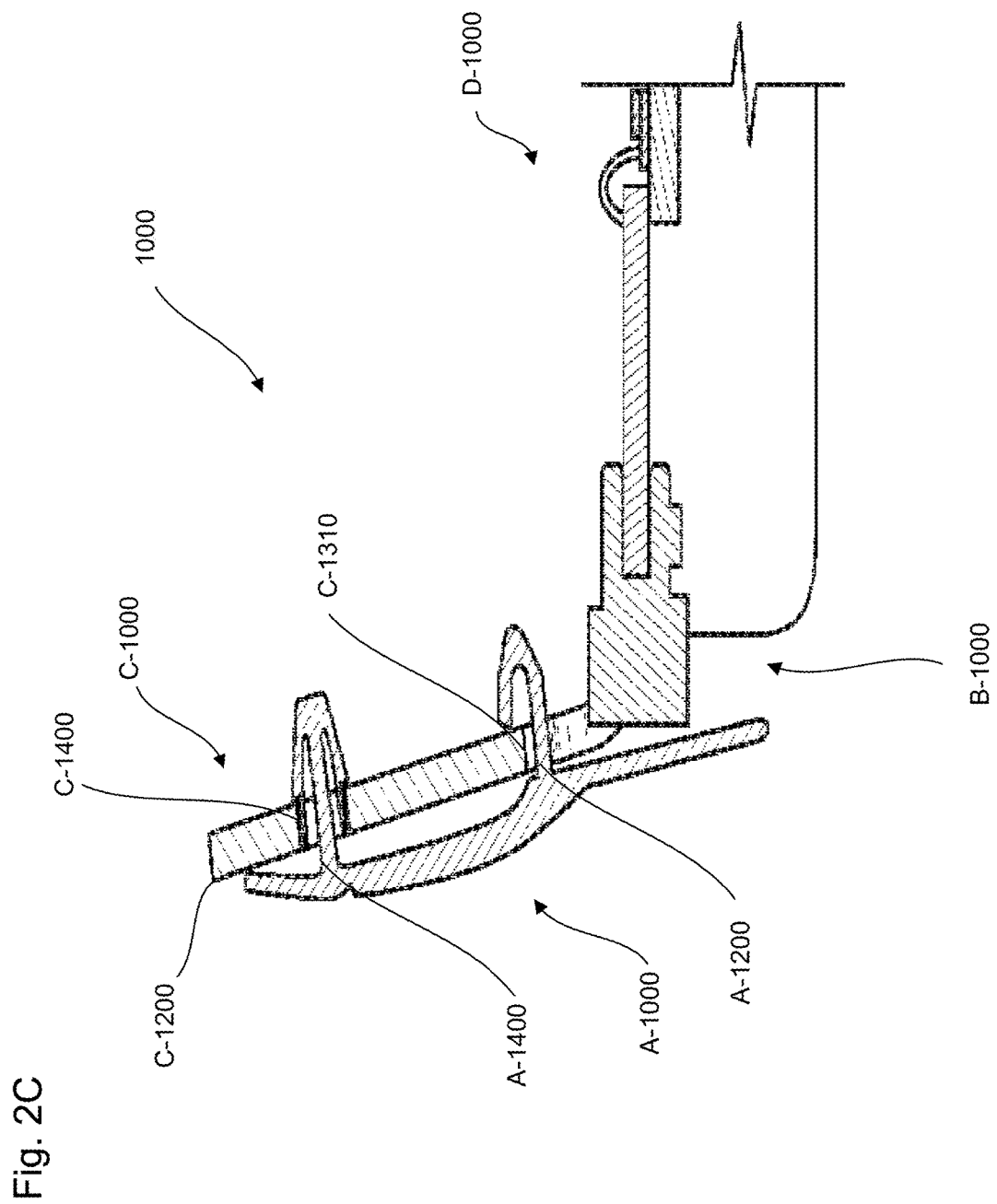
FIG. 2C is a sectional view of the light assembly, according to certain aspects of the disclosure.

FIGS. 2A-2C are a perspective exploded view, a perspective assembled view, and a sectional assembled view of the light assembly 1000, according to certain aspects of the disclosure.

The light assembly 1000 can include a support C-1000, an electronic assembly D-1000 affixed to the support C-1000, a connector B-1000 that connects the electronic assembly D-1000, and a fastening device A-1000 that engages into the support C-1000 and contacts the connector B-1000 to maintain the connector B-1000 connected to the electronic assembly D-1000.

The support C-1000 can provide support to the electronic assembly D-1000 and allow the electronic assembly D-1000 to be mounted onto other structures such as the housing 1100, see FIG. 1. In addition, the support C-1000 can provide heat dissipation for the electronic assembly D-1000 by acting as a heat sink.

The support C-1000 can include a support seat C-1100, a support wall C-1200 that protrudes from the support seat C-1100, a connector opening C-1300 positioned at a junction portion between the support seat C-1100 and the support wall C-1200, fastening device opening C-1400, and a plurality of mounting openings C-1500 positioned on the support wall C-1200.

The support seat C-1100 can receive the electronic assembly D-1000 while the fastening device opening C-1400 can receive the fastening device A-1000.

The plurality of mounting openings C-1500 can receive fixations, e.g. screws, bolts, hooks, or the like, to mount the support C-1000 onto the housing 1100 and provide support to the electronic assembly D-1000 through the support seat C-1100 and the support wall C-1200.

The connector opening C-1300 can provide access for the connector B-1000 to the electronic assembly D-1000.

The electronic assembly D-1000 can be any group of electrical elements, electronic parts that require connections with any elements other than elements of the light assembly 1000 that are placed externally and/or peripherally from the light assembly 1000, e.g. the power source 10 and/or the commands 20.

For example, the electronic assembly D-1000 can include a substrate D-1100, e.g. Printed Circuit Board (PCB), a plurality of electronic elements D-1200, e.g. capacitors, resistances, or the like, mounted on the substrate D-1100, light sources D-1300, e.g. light emitting diodes (LEDs), organic light emitting diodes (OLEDs), polymer light emitting diodes (PLEDs), and/or monolithic LEDs, mounted on the substrate D-1100, and a plurality tracks D-1400, e.g. conductive traces and/or wires, that electrically connects the plurality of electronic elements D-1200 and the light sources D-1300.

The connector B-1000 can be any kind of electrical connectors configured to provide electrical connections between the electronic assembly D-1000 and other elements of the lighting system 2000, e.g. power source 10 and/or commands 20.

For example, the connector B-1000 can include a connector housing B-1100 with a connector back wall B-1110, a connector mouth B-1200 opposite to the connector back wall B-1110, a plurality of connector legs B-1300 positioned inside the connector mouth B-1200, and a plurality of connector sockets B-1400 positioned on an external surface of the connector housing B-1100 and electrically connected to the plurality of connector legs B-1300.

The connector mouth B-1200 can receive a substrate peripheral portion D-1110 of the substrate D-1100 to have the plurality of connector legs B-1300 in electrical contact with the plurality of tracks D-1400 of the electronic assembly D-1000, and the plurality of connector sockets B-1400 can receives electrical wires to provide electrical connections between the electronic assembly D-1000 and other elements of the lighting system 2000.

FIGS. 2A-2C are a perspective view, a side view, and a sectional view of the fastening device A-1000, according to certain aspects of the disclosure.

The fastening device A-1000 can be manually, via an operator, or automatically, via motorized articulatable arm, inserted into the support C-1000 in order to maintain the connector B-1000 connected to the electronic assembly D-1000.

The fastening device A-1000 can include a head A-1100, a lower clip member A-1200 that protrudes from an upper portion A-1150 of the head A-1100, a tail A-1500, an upper clip member A-1400 that protrudes from a lower portion A-1510 of the tail A-1500, a body A-1300 that extends between the lower clip member A-1200 and the upper clip member A-1400 in a upward direction, and a ridge A-1600 positioned along the body A-1300 that protrudes from the body A-1300 in a backward direction.

The head A-1100 can contact the connector housing B-1100 and prevent the connector B-1000 from being disengaged from the electronic assembly D-1000, as illustrated in FIG. 2C.

The head A-1100 can include a head front surface A-1110, a head back surface A-1130 opposite to the head front surface A-1110, and a head edge A-1120 joining the head front surface A-1110 and the head back surface A-1130.

The head front surface A-1110 and the head back surface A-1130 can be substantially identical and/or symmetrical, and have shapes and/or dimensions to provide ergonomic comfort when the operator inserts the fastening device A-1000 onto the support wall-C-1200 and extracts the fastening device from the support wall C-1200. For example, the head front surface A-1110 and the head back surface A-1130 can have semi-ellipsoidal shape of a half circular shape to receive a finger of the operator and facilitate the insertion of the fastening device A-1000 onto the support wall C-1200 by having the finger pressing on the head back surface A-1130 and facilitate the extraction of the fastening device A-1000 from the support wall C-1200 by having the finger pulling on the head front surface A-1110.

The lower clip member A-1200 and the upper clip member A-1400 can be inserted in the connector opening C-1300 and in the fastening device opening C-1400 to maintain the body A-1300 against the support wall C-1200.

The lower clip member A-1200 can include a lower clip shank A-1210 that protrudes from the body A-1300 of the fastening device A-1000 in a forward direction, a lower clip arm A-1220 that protrudes in an oblique direction towards the body A-1300 from a terminal end of the lower clip shank A-1210, and a lower clip stop A-1230 positioned on a terminal end of the lower clip arm A-1220.

The lower clip arm A-1220 can bind between a closed position and an open position. In the closed position the lower clip arm A-1220 forms a first minimum predetermined angle Amin1 with the lower clip shank A-1210, while in the open position the lower clip arm A-1220 forms a first maximum predetermined angle Amax1.

The binding of the lower clip arm A-1220 from the open position to the closed position allows the lower clip member A-1200 to be inserted and go through the space provided between the notch C-1310 of the connector opening C-1300 and the connector B-1000. The articulation of the lower clip arm A-1220 from the closed position to the open position allows the lower clip arm A-1220 to extend over the notch C-1310 and push the body A-1300 against the support wall C-1200.

Figure 3A:
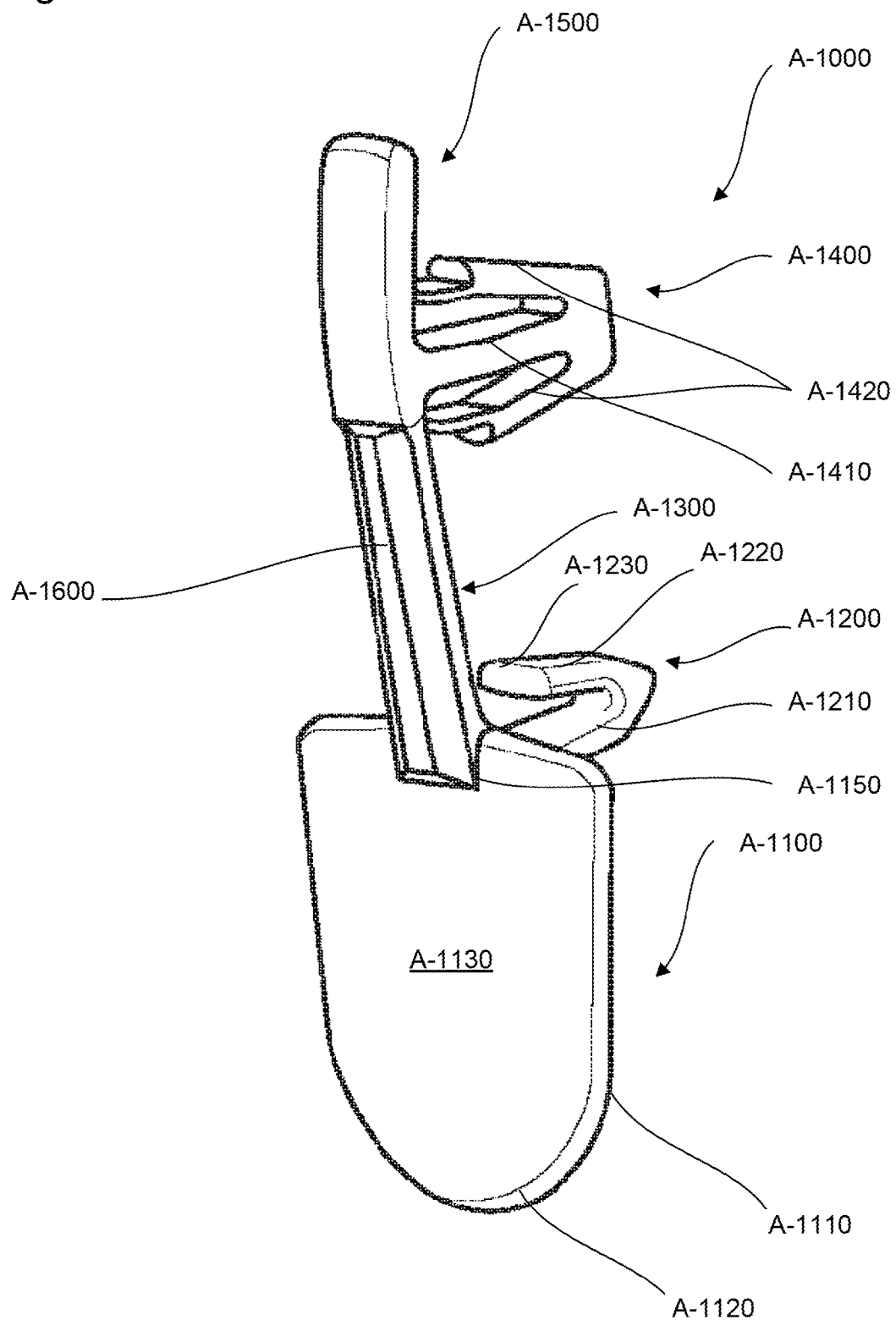
FIG. 3A is a perspective view of a fastening device of the light assembly, according to certain aspects of the disclosure.
Figure 3B:
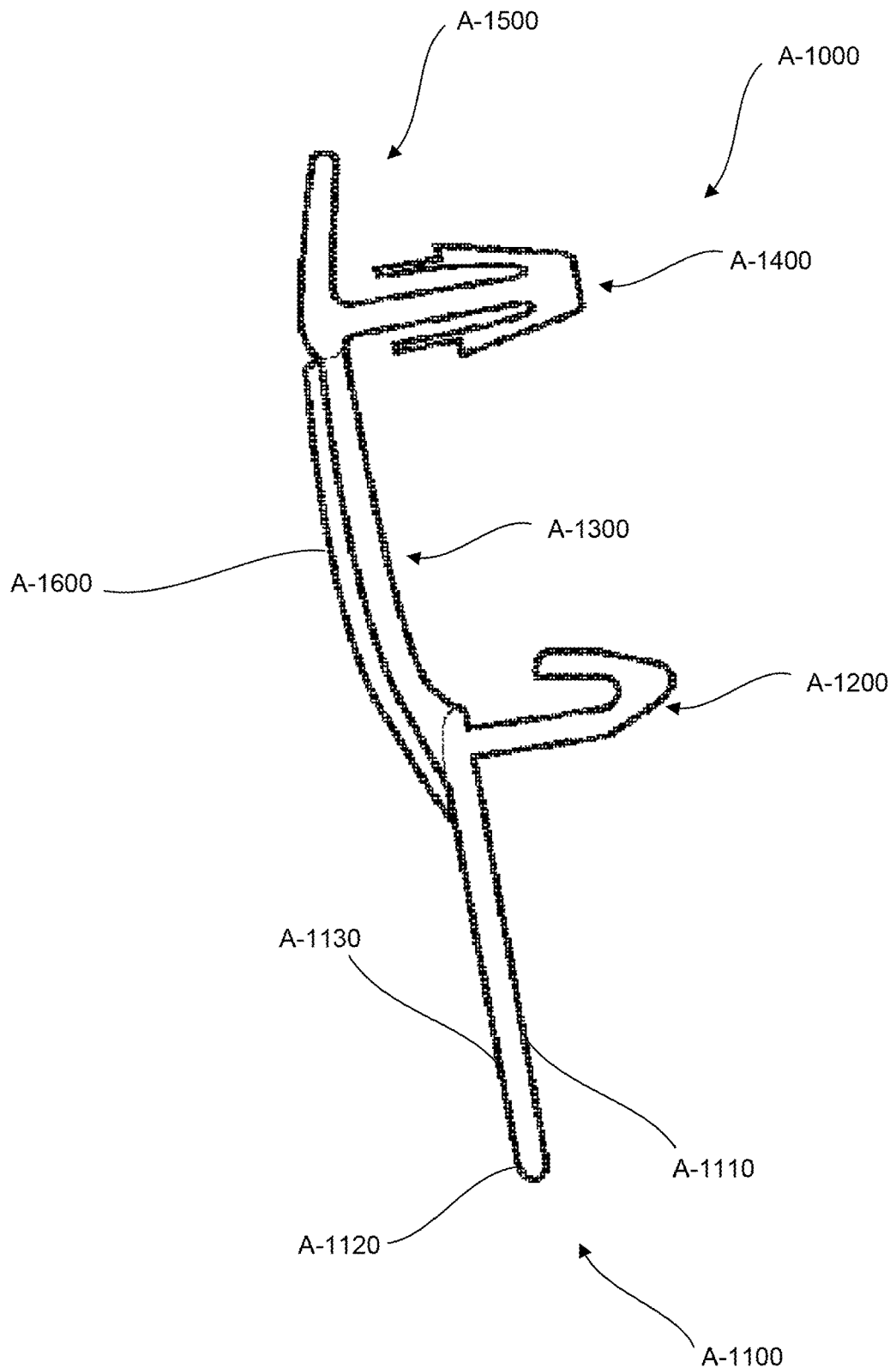
FIG. 3B is a side view of the fastening device, according to certain aspects of the disclosure.
Figure 3C:
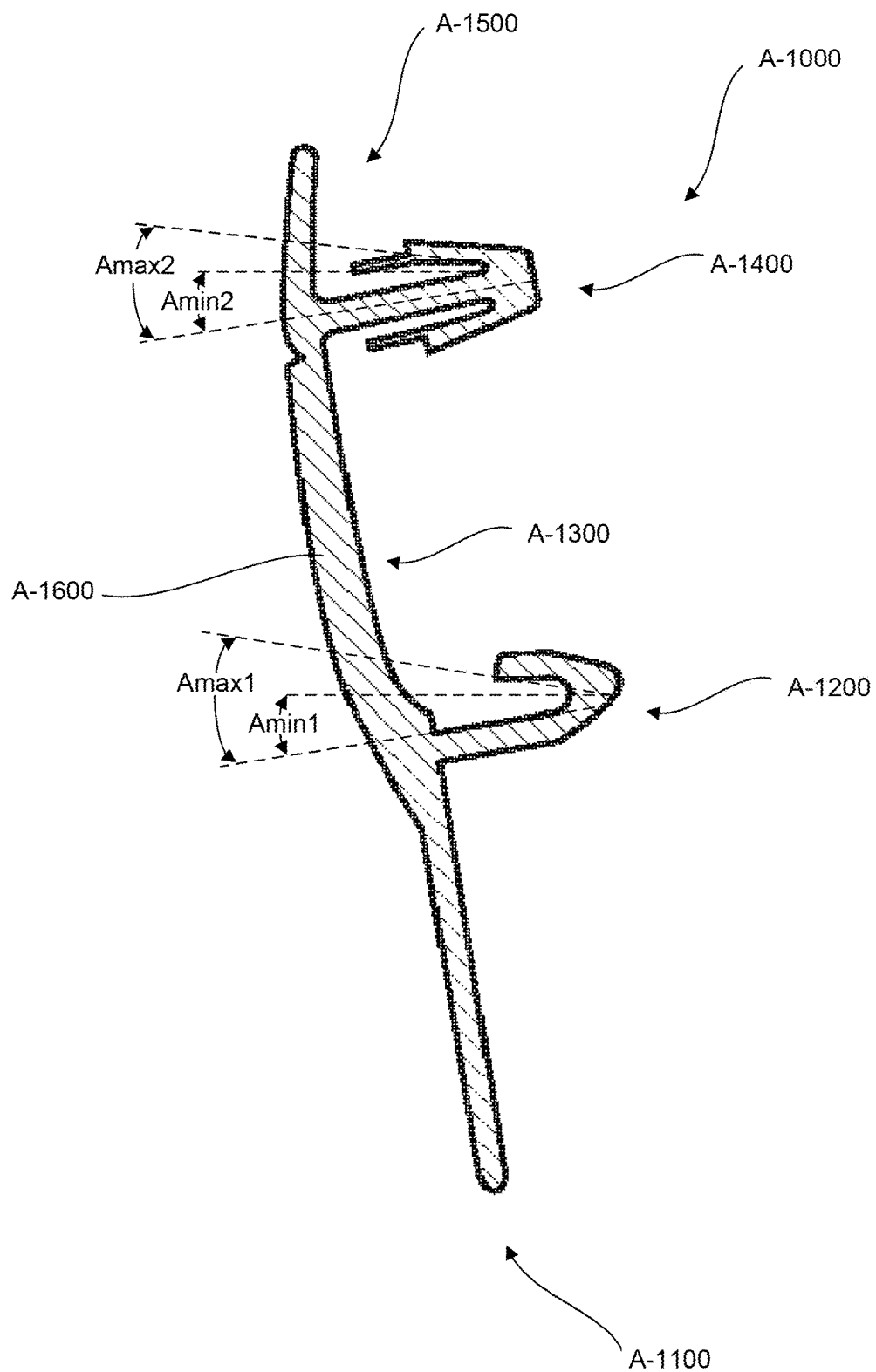
FIG. 3C is a sectional view of the fastening device, according to certain aspects of the disclosure.

The upper clip member A-1400 can include an upper clip shank A-1410 that protrudes from the body A-1300 of the fastening device A-1000 in a forward direction, a pair of upper clip arms A-1420 that protrudes in an oblique direction towards the body A-1300 from a terminal end of the upper clip shank A-1410, a pair of flukes A-1430 wherein each fluke protrudes from a terminal end of each upper clip arm A-1420, as illustrated in FIG. 3C.

The pair of upper clip arms A-1420 can bind between a closed position and an open position. In the closed position the pair of upper clip arms A-1420 forms a second minimum predetermined angle Amin2 with the upper clip shank A-1410, while in the open position the pair of upper clip arms A-1420 forms a second maximum predetermined angle Amax2.

The binding of the pair of upper clip arms A-1420 from the open position to the closed position allows the upper clip member A-1400 to be inserted and go through the fastening device opening C-1400. The articulation of the pair of lower clip arms A-1220 from the closed position to the open position allows the pair of flukes A-1430 to contact a front edge C-1410 of the fastening device opening C-1400 and maintain the fastening device A-1000 against the support wall C-1200, as illustrated in FIG. 2C.

The body A-1300 can provide support between the upper clip member A-1400, the lower clip member A-1200, and the head A-1100, to allow the head A-1100 to contact the connector back wall B-1110 of the connector B-1000 and prevent disconnection and/or misconnection between the connector B-1000 and the electronic assembly D-1000.

The tail A-1500 can have a curved shape to provide a predetermined bias force on the support wall C-1200 and press the head A-1100 against the connector B-1000.

In addition, the tail A-1500 can facilitate the extraction of the fastening device A-1000 from the support wall C-1200. For example, when the fastening device A-1000 is engaged into the support wall C-1200, the tail A-1000 can partially recover a support wall upper portion C-1210 of the support wall C-1200 and protrude in an upward direction from the support wall upper portion C-1210 to provide an access surface and/or tab that can be used, e.g. by an operator, to pull the fastening device A-1000 away from the support wall C-1200 and disengage the upper clip member A-1400 and the lower clip member A-1200 from the fastening device opening C-1400 and the connector opening C-1300.

The ridge A-1600 can enhance support between the lower clip member A-1200 and the upper clip member A-1400 and enhance the holding of the head A-1100 against the connector B-1000. In addition, the ridge A-1600 can enhance ergonomic features of the fastening device A-1000 by providing a support on which the operator can grab the fastening device A-1000 between the fingers.

Before being inserted into the support C-1000, the fastening device A-1000 can be positioned such that the lower clip member A-1200 and the upper clip member A-1400 face the notch C-1310 and the fastening device opening C-1400, respectively. For positioning the fastening, device A-1000, the operator can manually hold the body A-1300 of the fastening device A-1000 by grabbing the ridge A-1600 between his or her finger, e.g. between the thumb and the index, to let the lower clip member A-1200 and the upper clip member A-1400 free from obstruction, e.g. other fingers, and facilitate the positioning of the fastening device A-1000.

The fastening device A-1000 can be inserted into the support C-1000 such that the head A-1100 maintains the connector B-1000 in place and prevents disconnections between the connector B-1000 and the electronic assembly D-1000 from happening, as illustrated in FIG. 3C. For inserting the fastening device A-1000, the operator can manually push the lower clip member A-1200 and the upper clip member A-1400 onto the notch C-1310 and the fastening device opening C-1400, respectively.

The operator can manually push the head A-1100 against the support wall C-1200 by pressing on the head back surface A-1130 with his or her fingers, e.g. the thumb.

As the lower clip member A-1200 is inserted into the notch C-1310, the lower clip arm A-1220 binds from the open position to the closed position to allow the lower clip arm A-1220 to go through the connector opening C-1300 and through the notch C-1310. Once the lower clip arm A-1220 passes the notch C-1310, the lower clip arm A-1220 binds back from the closed position to the open position. Once the lower clip arm A-1220 is inserted in the notch C-1310, the lower clip stop A-1230 rest on the forward portion of the support wall C-1200 to maintain the fastening device A-1000 against the support wall C-1200, as illustrated in FIG. 2C.

As the upper clip member A-1400 is inserted into the fastening device opening C-1400, the pair of upper clip arms A-1420 binds from the open position to the closed position to allow the pair of upper clip arms A-1420 to go through the fastening device opening C-1400. Once the pair of upper clip arms A-1420 passes the fastening device opening C-1400 the pair of upper clip arms A-1420 binds back from the closed position towards the open position until the pair of flukes A-1430 contacts a front edge C-1410 of the fastening device opening C-1400. Once the pair of upper clip arms A-1420 is inserted in the fastening device opening C-1400, the pair of flukes A-1430 rest on the front edge C-1410 of the fastening device opening C-1400 and in combination with the pair of upper clip arms A-1420 maintain the fastening device A-1000 against the support wall C-1200.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A light assembly for vehicle comprising:
   an electronic assembly;
   a connector that engages in the electronic assembly;
   a support that supports the electronic assembly, the support having:
      an opening, and
      a connector opening that provides to the connector access to the electronic assembly; and
   a fastening device that engages in the support, the fastening device having:
      a body,
      a first clip member that engages in the opening, the first clip member having:
         a first shank that protrudes substantially perpendicularly from the body, and
         a first arm that protrudes from the first shank towards the body,
      a second clip member that engages in the connector opening, the second clip member having:
         a second shank that protrudes substantially perpendicular from the body, and
         a pair of second arms that protrudes from the second shank towards the body, and
      a head affixed to one end of the body in order to be offset relative to a center of the body, and that contacts the connector and maintains the connector engaged in the electronic assembly.

2. The light assembly of claim 1, wherein the first arm is bendable from an open position to a closed position to have the first clip member inserted in a notch of the opening connector.

3. The light assembly of claim 1, wherein the pair of second arms is articulatable from an open position to a closed position to have the second clip member inserted in the opening.

4. The light assembly of claim 3, wherein each second arm of the pair of second arms includes a fluke that rests on an edge of the opening when the second clip member is inserted in the opening.

5. The light assembly of claim 1, wherein the body further includes a ridge.

6. The light assembly of claim 1, wherein the fastening device further includes a tail that protrudes from the body.

7. The light assembly of claim 1, wherein the electronic assembly includes a printed circuit board.

8. The light assembly of claim 7, wherein the support includes a seat to receive the printed circuit board and to act as a heat sink.

9. The light assembly of claim 8, wherein the connector includes a mouth to receive a peripheral edge of the printed circuit board.

10. A fastening device to maintain a connector engaged in an electronic assembly, the fastening device comprising:
    a body;
    a first clip member that engages in a first opening, the first clip member having:
       a first shank that protrudes substantially perpendicularly from the body, and
       a first arm that protrudes from the shank towards the body;
    a second clip member that engages in a second opening, the second clip member having:
       a second shank that protrudes substantially perpendicular from the body, and
       a pair of second arms that protrudes from the second shank towards the body; and
    a head affixed to one end of the body in order to be offset relative to a center of the body, and that contacts the connector and maintains the connector engaged in the electronic assembly.

11. The fastening device of claim 10, wherein the first arm is bendable from an open position to a closed position to have the first clip member inserted in the first opening.

12. The fastening device of claim 10, wherein the pair of second arms is bendable from an open position to a closed position to have the second clip member inserted in the second opening.

13. The fastening device of claim 12, wherein each second arm of the pair of second arms includes a fluke that rests on an edge of the second opening when the second clip member is inserted in the second opening.

14. The fastening device of claim 10, wherein the body further includes a ridge.

15. The fastening device of claim 10, wherein the fastening device further includes a tail that protrudes from the body.

16. A fastening device to maintain a connector engaged in an electronic assembly, the fastening device comprising:
   a body;
   a clip member that engages in an opening, the clip member having:
      a shank that protrudes substantially perpendicular from the body, and
      a pair of arms that protrudes from the shank towards the body; and
   a head affixed to one end of the body in order to be offset relative to a center of the body, and that contacts the connector and maintains the connector engaged in the electronic assembly.

17. The fastening device of claim 16, wherein the pair of arms is bendable from an open position to a closed position to have the clip member inserted in the second opening.

18. The fastening device of claim 17, wherein each arm of the pair of arms includes a fluke that rests on an edge of the opening when the clip member is inserted in the opening.

19. The fastening device of claim 16, wherein the body further includes a ridge.

20. The fastening device of claim 16, wherein the fastening device further includes a tail that protrudes from the body.

* * * * *